US011288712B2

(12) United States Patent
Roebuck

(10) Patent No.: US 11,288,712 B2
(45) Date of Patent: Mar. 29, 2022

(54) VISUAL ITEM IDENTIFICATION AND VALUATION

(71) Applicant: HRB Innovations, Inc., Las Vegas, NV (US)

(72) Inventor: Eric R. Roebuck, Shawnee, KS (US)

(73) Assignee: HRB Innovations, Inc., Las Vegas, NV (US)

( * ) Notice: Subject to any disclaimer, the term of this patent is extended or adjusted under 35 U.S.C. 154(b) by 564 days.

(21) Appl. No.: 15/860,947

(22) Filed: Jan. 3, 2018

(65) Prior Publication Data

US 2019/0205949 A1  Jul. 4, 2019

(51) Int. Cl.
*G06Q 30/02* (2012.01)
*G06F 16/583* (2019.01)
*G06F 16/783* (2019.01)
*G06Q 30/06* (2012.01)

(52) U.S. Cl.
CPC ....... *G06Q 30/0278* (2013.01); *G06F 16/583* (2019.01); *G06F 16/783* (2019.01); *G06Q 30/06* (2013.01)

(58) Field of Classification Search
CPC ............. G06Q 30/0278; G06Q 10/087; G06Q 30/0206
See application file for complete search history.

(56) References Cited

U.S. PATENT DOCUMENTS

| | | | |
|---|---|---|---|
| 2013/0028487 A1* | 1/2013 | Stager | B07C 5/342 382/110 |
| 2015/0127430 A1* | 5/2015 | Hammer, III | G06Q 30/0623 705/7.35 |
| 2017/0061506 A1* | 3/2017 | Dow | G06F 16/9537 |
| 2018/0349847 A1* | 12/2018 | Nurick | G06Q 10/0875 |

OTHER PUBLICATIONS

Javornik, Ana, The Mainstreaming of Augmented Reality: A Brief History (Oct. 4, 2016) retrieved from URL <https://hbr.org/2016/10/the-mainstreaming-of-augmented-reality-a-brief-history> on Nov. 2, 2020. (Year: 2016).*
Q You, R Pang, L Cao, J Luo—IEEE transactions on multimedia, 2017—ieeexplore.ieee.org.*

* cited by examiner

*Primary Examiner* — Julie M Shanker
(74) *Attorney, Agent, or Firm* — Erise IP, P.A.

(57) ABSTRACT

Items are identified and valuated based at least in part on an image that shows a depiction of the one or more items. The image is analyzed to identify the items, such as by a categorization. The items are valuated based upon the description, category, and/or additional information from the user about the items. The valuation is also based upon information from a valuation database. The identification and valuation may then be used for any of numerous purposes.

20 Claims, 6 Drawing Sheets

VISUAL ITEM IDENTIFICATION AND VALUATION

BACKGROUND

1. Field

Embodiments of the invention relate to the identification and valuation of an item based at least in part on a visual representation, such as image or video data, of the item.

2. Related Art

Identifying and valuating objects have been performed manually and imprecisely by people for millennia. This is typically either a time-consuming and laborious process to do correctly, or is improvised and done imprecisely. For many applications, the improvised method works well enough. For other applications, improvisation is either not allowed or is disadvantageous for various reasons. In these applications, either the laborious identification and valuation is needed or value can be lost, because justification may be needed for the identification and valuation.

Cameras are becoming ubiquitous, as they are in smart phones, tablets, and other computing devices. Taking and storing digital photographs and videos has become simple and easy. What is lacking in the prior art is a system and computerized method of leveraging a digital camera to identify and valuate items appearing in an image or video stream of the digital camera.

SUMMARY

Embodiments of the invention solve the above-mentioned problems by providing a system, a computerized method, and a computer program for identifying and valuating items based at least in part on an image or video stream that shows a depiction of the one or more items. The image or video stream is analyzed to identify the items, such as by a categorization. The items are valuated based upon the description, category, and/or additional information from the user about the items.

A first embodiment of the invention is directed to a non-transitory computer readable storage medium having a computer program stored thereon for identifying and valuating an item, wherein execution of the computer program by at least one processing element performs the following steps: acquiring an image; analyzing the image to determine a category associated with the item; displaying, to a user via a graphical user interface, a request for additional information for the item; accessing a valuation database to acquire a set of valuation information; and determining a valuation for the item, based at least in part on the category, the additional information, and the valuation information from the valuation database.

A second embodiment of the invention is directed to a non-transitory computer readable storage medium having a computer program stored thereon for identifying and valuating items based upon an image, wherein execution of the computer program by at least one processing element performs the following steps: analyzing the image to determine a first item and a second item; determining a first category that corresponds to the first item and a second category that corresponds to the second item; displaying, to a user via a graphical user interface, a request for additional information for the first item; accessing a valuation database to acquire a set of valuation information; determining a first valuation for the first item, based at least in part on the first category, the additional information, and the valuation information from the valuation database; and determining a second valuation for the second item, based at least in part on the second category and the valuation information from the valuation database.

A third embodiment of the invention is directed to a system for identifying and valuating items based upon an image, the system comprising a camera, a valuation database, and a processor. The camera is configured for capturing an image. The valuation database has associated valuation information. The processor is configured to: analyze the image to determine a category associated with the item; present, to a user via a graphical user interface, a request for additional information for the item; access the valuation database to acquire a set of valuation information; and determine a valuation for the item, based at least in part on the category, the additional information, and the valuation information from the valuation database.

Still other embodiments of the invention may be directed to a computerized method of implementing the above-discussed steps. Still other embodiments of the invention may be directed to a system that comprises a server and a user device. The server is configured to receive information from the user device to implement the above-discussed steps.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
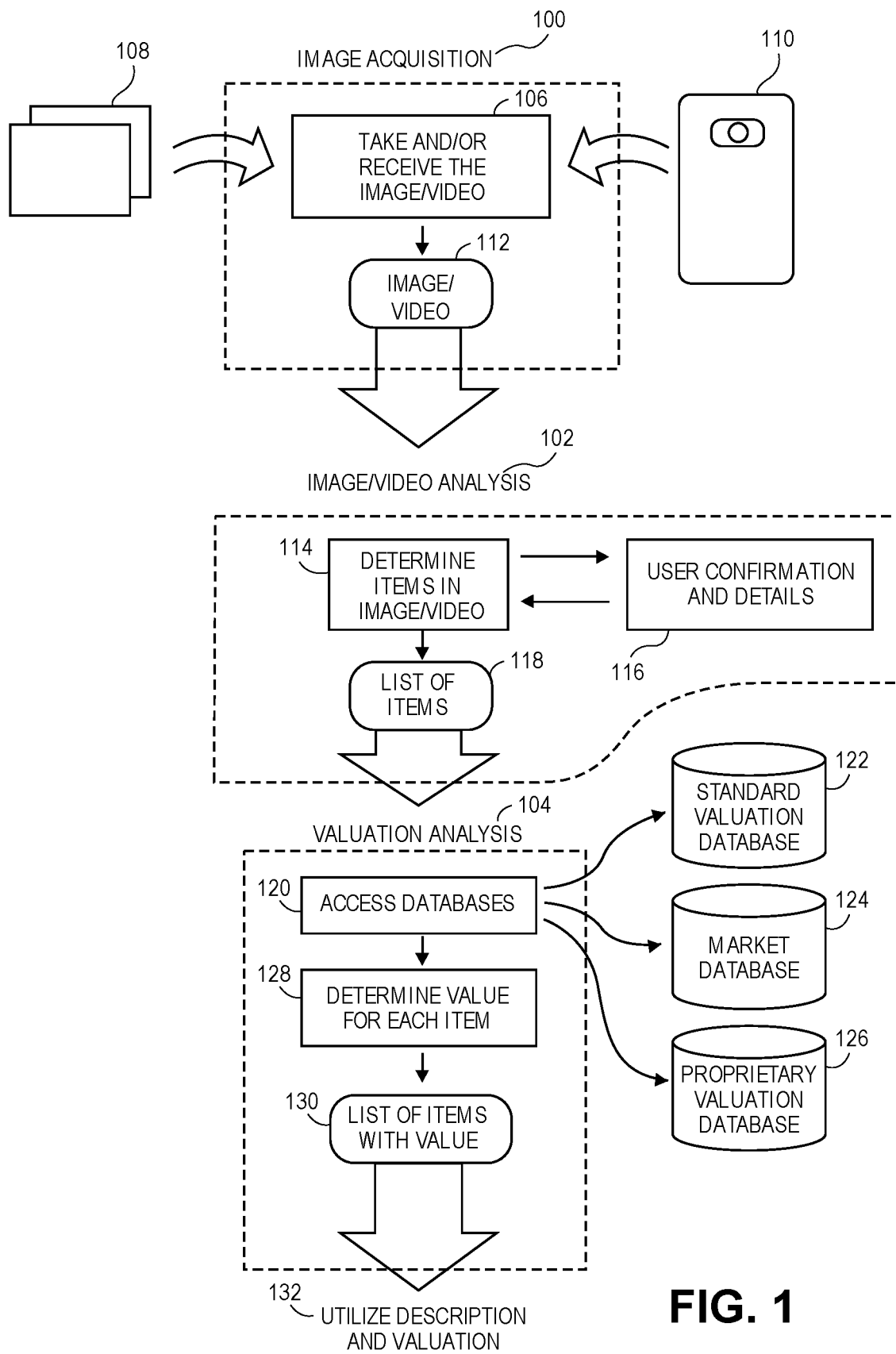
FIG. 1 is a flow diagram of an exemplary embodiment of the invention that assist in identifying and valuating an item.

The drawing figures do not limit embodiments the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, embodiments of the invention can include a variety of combinations and/or integrations of the embodiments described herein.

Embodiments of the invention comprise a system, a computerized method, and a computer program for identifying and valuating at least one item depicted in an image. The identification and valuation may then be utilized by the system in various ways or exported to another system. A few exemplary uses are discussed below. The identification and valuation are performed on an image, in embodiments, such that the item or items to be identified and valuated are or were adjacent to the user. The user is therefore provided with a service to identify and valuate objects in their proximity.

It should be appreciated that these steps of identifying and valuating objects have been performed manually and imprecisely by people for millennia. This is typically either a time-consuming and laborious process to do correctly, or is improvised and done imprecisely. While improvisation may be suitable for some situations, such as an offer to sell or buy, the time-consuming and laborious process may be needed for other situations. For any of various reasons, justification may need to accompany the identification and/or the valuation claimed or asserted. A few examples of these reasons are discussed below.

Turning to the figures, FIG. 1 presents an exemplary flow diagram illustrating various steps of embodiments of the invention. Generally, in Step 100, the system acquires image data or video data. In Step 102, the system analyzes the image, images, video data, video stream, or other information (which may be generically referred to as "images") that was acquired in Step 100. In Step 104, the system valuates the items in the images that were analyzed in Step 102. Following Step 104, these valuations may be used in various ways and for various purposes, a few examples of which are discussed below. The various sub-steps of Steps 100-104 are discussed below. It should be appreciated that, as with other steps discussed herein, the steps described herein are not necessarily in order: not all steps need be performed in all embodiments, steps may be performed in any order, some steps may be performed simultaneously, some steps may be performed more than once, etc.

In Step 106, the image acquisition begins by the system taking, receiving, or otherwise acquiring an image or video. It should be appreciated that in some embodiments, this process is begun with an already existing photograph or video. For example, already existing photographs taken within a home that was subject to a natural disaster may be analyzed for insurance purposes to identify objects their corresponding values. In other embodiments, the photograph is taken specifically for the purpose of identifying and valuating items. For example, the user may take a photograph of items to be donated to a charitable organization such that the items may be identified and valuated.

In Step 108, the image may be received as an image or video file. This may include the user accessing, uploading, downloading, receiving, sending, or otherwise acquiring an image or video file. The image or video file may be stored locally or externally from the system. For example, if the system runs in part on a user smart phone, the system may access image and video information stored on the smart phone, whether taken by the smart phone camera or downloaded to the phone, or both.

In Step 110, the image may be taken by a camera associated with a user device that is accessed (directly or indirectly) by the system. For example, in embodiments, the system may be or may be associated with an application (an "app") on the user's smart phone. The app may access the camera functions of the smart phone to take an image or video. The image or video may then be directly imported or otherwise utilized by the system to perform the below discussed steps. In some embodiments of the invention, the steps are performed on completed images and video data, e.g., discrete images and video files. The analysis may be performed directly after completion of the image or video data, or at a later date and time. For example, the image or video may be originally taken for the purpose of the analysis, or the analysis may be performed on an otherwise already existing image or video.

In other embodiments of the invention, the steps are performed on live and/or streaming video data. In these embodiments, the user points their smart phone camera toward the items or items to be analyzed. The system will display the streaming or live image from the video camera on a graphical user interface (GUI). Overlays may then be shown on the graphical user interface and on the video stream so as to present an augmented reality to the user. For example, embodiments of the invention may utilize the Google Vision API to analyze photo or video and identify items in the image. The below discussed confirmations and additional information may be requested and received from the user in substantially real time.

In Step 112, the image is produced, isolated, captured, or otherwise identified. The image may be identified through any of the above discussed methods or a combination thereof. The identified image may be tagged, embedded, or otherwise associated with metadata regarding the time, date, place, orientation, manner, camera, and other information regarding the image. The identified image may then be stored for later analysis, may be immediately analyzed, or may be analyzed during the capturing process (such as in the augmented reality example described above).

Figure 2:
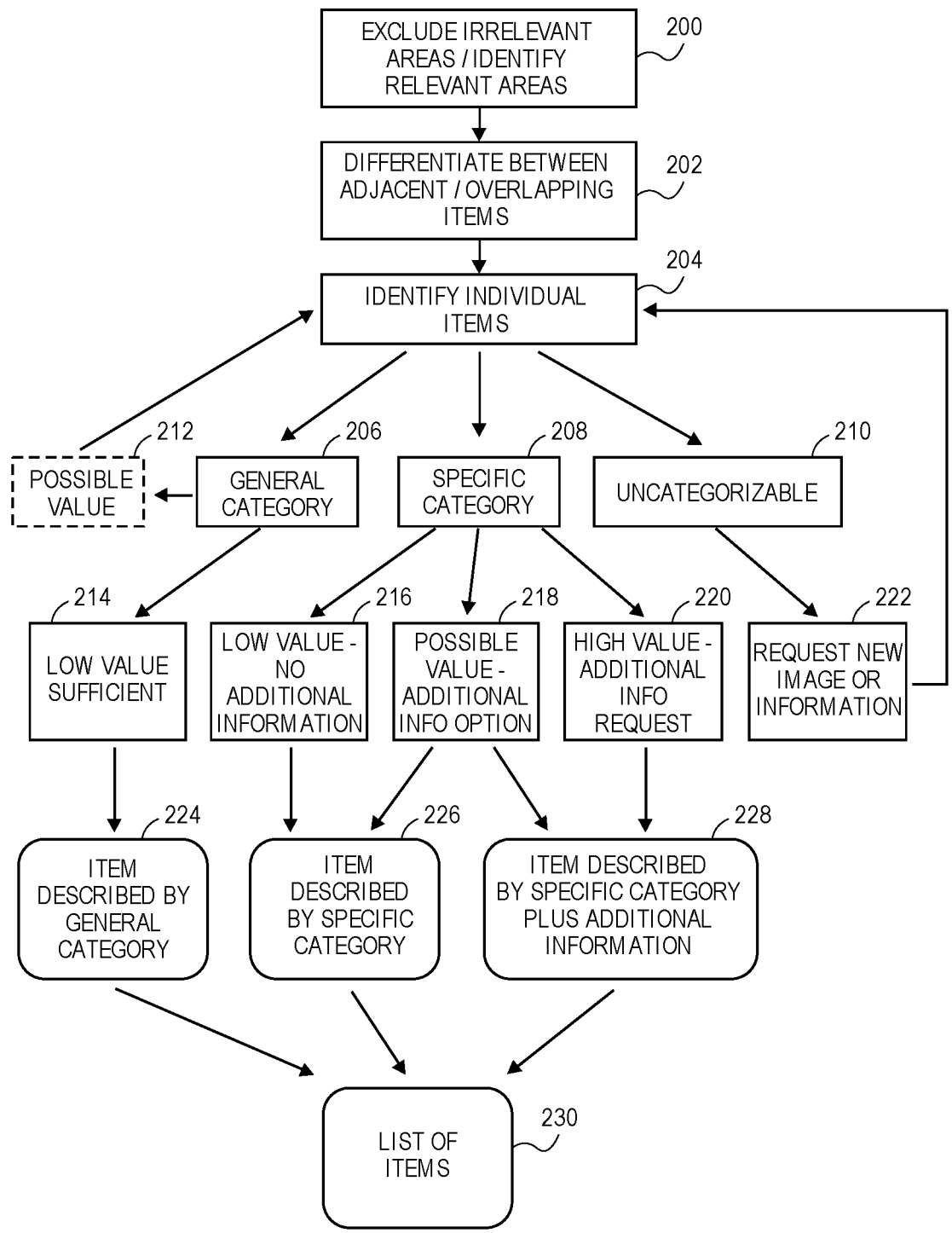
FIG. 2 is a flow diagram illustrating more detailed steps in identifying items.

In Step 114, the image analysis begins by the system determining at least one item in the image. This step is discussed in much more depth below with regard to FIG. 2. In some embodiments, this step may be performed by an external application or algorithm. For example, the system may upload the image or video data to a third party or other external image analyzer. The image analyzer may return a description for the item or items appearing in the image. In other embodiments, the steps may be performed internally such that the system is performing the analysis. For example, the analysis may be performed at least partially on the user device based upon known or expected characteristics of the item to be identified.

In embodiments of the invention, the analyzer also analyzes trends in the identification of items so as to improve the future iterations of the system. The trends may be identified using any statistical techniques, now known or later developed. For example, pairwise correlations may be calculated across multiple similar items in similar images. In some embodiments, multiple regressions may also be used to identify correlated triples or n-tuples. In other embodiments, neural-network based techniques such as Restricted Boltzmann Machines can be used to identify trends within the images. In still other embodiments, matrix-based techniques such as SVD++ can be used to identify trends. One of skill in the art will appreciate that there are a variety of other statistical and machine-learning techniques that can be used to determine sets trends. However, in some instances a set of trends within a data set may not be used to identify errors within that data set, because the errors may be present in the data set. As such, machine learning techniques may identify these errors as being normal.

In Step 116, the user is presented with a request for confirmation. The request for confirmation may include an indication of a general category, a specific category, a specific description, a lack of classification, or other indication. These requests for confirmation may be presented directly to the user or indirectly. In a direct presentation, the user is presented, on the GUI, a text box or alert box directly requesting the confirmation. In the indirect presentation, the category or description is presented on the graphical user interface such that the user may select and correct the information if appropriate, or may approve all explicitly or implicitly. If the user denies the confirmation, the user may be presented with an option to correct the incorrect information, or the analysis may be performed again excluding the incorrect information, or both. In some embodiments, these corrections are stored such that future iterations of the method are improved so as to be more likely to correctly identify the item.

In Step 118, a list of items is generated or identified. The list of items may be generated before or after the valuation steps discussed below. For example, in some embodiments, the valuation is performed upon the identified items while or before the items are being generated into a list. As such, a discrete list of items may not be produced in all embodiments of the invention, or may not be produced until valuations have also been produced.

In Step 118, a list of items is generated or identified. The list of items may be generated before or after the valuation steps discussed below. For example, in some embodiments, the valuation is performed upon the identified items while or before the items are being. As such, a discrete list of items may not be produced in all embodiments of the invention, or may not be produced until valuations have also been produced.

In Step 120, the valuation analysis begins by accessing at least one database regarding the value of the item in the list of items. It should be appreciated that in some embodiments, any or all of the databases may be external to the system, such that valuations are requested and received, or the associated information is pulled from the databases externally. In other embodiments, any or all of the databases may be internal to the system, such that valuations are calculated or otherwise determined within the system. Any or all of various databases may be accessed to determine valuation. The various databases may be stored locally on the system or accessed remotely. For example, embodiments of the invention running on a user smart phone may access, via the Internet or other connection, a database including valuation information for at least one of the items described. Valuation information may include direct valuation information (such as a stored or otherwise static monetary value associated with items meeting that description) and/or indirect valuation information (such as a current asking or selling price for the item in a marketplace).

In Step 122, an exemplary database that may be accessed is a standard valuation database. A standard valuation database includes a standard value for the item. Typically, the standard valuations are relatively static. For example, the standard valuation may change once per year, tied to inflation, the consumer price index, a current market value, or other market indicator. The standard valuation may be faster and simpler to determine than the other databases described below. This is because there is a single set value for all items fitting the description, so little to no further analysis is needed. The standard valuation database (or the data stored therein) may be publicly available, such as published by a government entity.

In Step 124, an exemplary database that may be accessed is a market database. The market database is associated, either directly or indirectly, with a marketplace where like items are being bought and/or sold. Valuation from the market database may therefore more accurately reflect prices and values that are true to the real world and are less hypothetical than the other databases. In some embodiments, the market database may be populated by valuations based upon observed market transactions and offerings for a certain type of item. This type of market database may be described as a passive market database, in which valuations for a certain type of item are periodically updated based upon the market but then immediately provided to the system upon request. In other instances, the market database may actively pull information upon receipt of the request for a valuation for a certain type of item. An example of a market database may include, utilize, or otherwise be associated with an application programming interface ("API") associated with an online marketplace. Such an API may be used to pull pricing information for various items that meet or are associated with the category or other item description.

In Step 126, an exemplary database that may be accessed is a proprietary valuation database. The proprietary valuation database includes valuations based upon previous valuations performed by the system or other proprietary data available to the system. The proprietary data may be based at least in part on information on the standard valuation database and/or the market database. The proprietary valuation database may also include information related to different items to aid in the identification of items, such as by learning from previous identifications.

In Step 128, the system determines a value for each item based at least in part on at least one database accessed. In some embodiments, the system selects the database that is most appropriate for the type of item, the purpose of the valuation, the amount (if any) of justification that is required to be included with the valuation, and/or other considerations. The system will then determine the valuation based upon information from that selected database. The valuation may be taken directly from the selected database or the information from the selected database may be weighted, scaled, or otherwise manipulated to calculate the valuation.

In some embodiments, a plurality of valuation databases may be accessed for a single item to be valuated. Further, a pre-valuation may be calculated based upon each of more than one the valuation databases. The pre-valuations may then be weighted, averaged, or otherwise combined into the total valuation. Alternatively, the pre-valuation most favorable to the user may be presented as the valuation, such as in instances where the user is allowed to select any valuation that can be supported with documentation. As another alternative, more than one pre-valuation may be presented to the user so as to allow the user to select the desired pre-valuation to be stored as the valuation.

In Step 130, the system generates a list of items with estimated values. The list of items may include each of the items and valuations individually. The list of items may also include a summation value calculated as a sum of the individual valuations. The list of items may also include a total value, which may be more or less than the summation value, based upon the quantities and relationships between the items. Some items may be calculated to have a negligible value such that the further steps performed using the list of items and valuations (discussed below) is not practical or necessary for the user. In these instances, the user may be presented with an option to delete these negligible value items or cancel the iteration of the system entirely.

In Step 132, the system utilizes the list of items and valuations. The usage or utilization of the list of items and valuations can be done in any of various fields of usage. A few exemplary fields of use will be briefly discussed, then a single exemplary field will be discussed in much more detail so as to provide the reader with a detailed example. It should also be appreciated that some embodiments of the invention are designed for no particular field of use. These embodiments may perform the discussed steps and provide the list of items and valuations to some external system. The external system may then perform whatever desired function is needed by the external system without consequence to or involvement by the embodiment of the invention.

A first exemplary field of use for the invention is in insurance claims adjusting. In this exemplary field of use, the image may be a photograph taken by an insured or an insurance adjuster. The items in the photograph may be items that were lost, damaged, or stolen. The image is analyzed to determine what items appear in the image and what values are associated with each such item.

A second exemplary field of use is in the field of auctioneering or other online marketplaces. In this exemplary field of use, the image may be a photograph taken by a seller or auctioneering service. The items in the photograph are items to be auctioned or sold. The image is analyzed to determine a description of the items as well as an opening bid price, a bid to make, a "buy now" price, or other valuation.

A third exemplary field of use is in the field of interpersonal transactions. In this exemplary field of use, the image may be a photograph taken by a buyer or seller. The items in the photograph are the items to be sold. The description and valuation is used as an independent, automated third-party appraisal of the items, so as to provide some assurance to the buyer and/or seller that the sale is fair.

As discussed in detail below, a fourth exemplary field of use of the invention is in the field of tax preparation, specifically the identification and valuation of non-cash charitable donations. The non-cash charitable donations are documented such that they may be deducted from the taxes of the taxpayer (as discussed in more depth below). In this exemplary field of use, the image may be a photograph taken by a taxpayer or agent of a charitable organization. The items in the photograph are items to be or that have been donated to the charitable organization. The image is analyzed to determine identify and valuate the items. This saves time and effort by the taxpayer in selecting items from a list and estimating values. The description and valuation information is used to provide a justification for the taxing authority (either supplied directly or kept in case of audit).

It should be appreciated that some embodiments of the invention are a tax return preparation program (such as an at-home tax preparation program or a professional tax preparation program). Other embodiments may be ancillary or secondary functions associated with a tax preparation program. A set of taxpayer information may additionally or alternatively be received. The set of taxpayer information may include additional known information about the taxpayer, such as account information, previous year tax returns, qualitative information, quantitative information, or other information known about the taxpayer. The image may also be received with, or as a component of, the set of taxpayer information. Other embodiments of the invention are or are associated with a year-round donation tracking application, a financial services application, a banking application, or other application configured to be used by the user at a time other than the preparation of a tax return.

It should be appreciated that in embodiments of the invention, the discussed steps may be performed before or during completion of the tax return, upon the user reaching a certain step in the completion of the tax return, upon specific request of the user, as a premium feature available to the user, or at another time. For example, the below discussed steps may be performed while the taxpayer or other user is providing information to a tax return preparation program. As a more specific example, upon the input of income information, the steps discussed below may be begun before presenting the user with deduction and credit information (such as a request for images of charitable donations that were taken during the year, such that the steps may be performed before the user arrives at deduction-related steps). The steps may be performed periodically such that the steps may be performed more than once during the preparation of the tax return. Successive iterations of the below-discussed steps may include updated and additional information that is received later from the user.

The taxpayer may include any entity, either a legal or natural person, that files a tax return with a government taxing authority. The taxpayer may also be a married couple or other plurality of individuals filing a single tax return. Taxes to be paid can be United States Federal Income Tax, income tax for the various states within the United States, corporate taxes, partnership taxes, LLC taxes, property taxes, tariffs, or other taxes. Typically, the taxpayer provides information relevant to themselves and the amount of tax owed in the form of the tax return (based upon incomes, expenses, and the like). The tax return may therefore include information indicative of the employer and other external entities to which the taxpayer is or may be associated. The tax return may also include information indicative of various benefits that the taxpayer is utilizing (or has utilized during the tax year).

The image or video may have potential tax implications, such as in the case where the image or video shows one or more items donated to a charity. For example, the user may be presented with various questions that may have potential tax implications, such as the name of the items, the charitable organization to which the items were donated, and the approximate value of the items. This can also include receiving receipts and other tax-relevant documents (or information indicative of tax-relevant documents). During tax return preparation, the image or video may be previously recorded and previously analyzed, previously recorded and presently analyzed, or presently recorded and presently analyzed.

Tax return preparation may take place in any of various methods. In one embodiment, the taxpayer brings physical copies of his tax-related documents, such as W2s and 1099s, to the tax preparer. A tax preparer then enters information from the tax-related documents into a tax preparation computer program. In another embodiment, the taxpayer enters information from the tax-related documents into tax preparation software. The tax preparation computer program may be the same as or interface with the computer program of embodiments of the invention. In addition, the taxpayer answers questions related to his taxes, either verbally to the tax preparer or by inputting into the computer program.

The tax return is essentially a report filed with the appropriate government taxing authority, such as the Internal Revenue Service in the case of U.S. federal income tax. Typically, the tax return contains information used to calculate the tax due. Typically, the tax return is either printed or hand-written on a form generated by the taxing authority, such as the Form 1060. However, the tax return could be on another type of form, a financial document, or other document. On the tax return, the taxpayer or tax preparer calculates the taxes due. To assist in the calculation and to allow the taxing authority to verify the calculations, the tax return contains pertinent information associated with the taxpayer for the tax year. The tax return can be either written, digital, or a combination of both. In other embodiments, information relevant to the taxpayer and the tax to be paid are provided on other various forms and documents, such as a Form W2 or a Form 1099.

In this field of use, the identification and valuation of the items is performed, at least in part, based upon the tax implications of the determination. The implications of non-cash charitable donations are primarily discussed in this exemplary field of use, but other implications may also be impacted by the identification and valuation of various items. Implications are programs, code sections, benefits, and other aspects of the tax code that change a tax liability for the taxpayer. Implications may also originate in regulations, rulings, administrative agencies, and entitlement programs. For example, implications may include income sources, tax deductions, and tax credits. More specific examples of deductions include trade and business deductions, losses from sale or exchange of property, deductions from rents and royalties, pensions and annuities, retirement savings, alimony, moving expenses, interest on educational loans, higher education expenses, health savings accounts, startup expenses, expenses for determining tax owed, management of rental properties, charitable donations, medical care, various types of interest, depreciation, creation of a corporation, losses in a business or trade, business meals, entertainment related to business, trade and business education, state and local taxes. More specific examples of tax credits include taxes withheld, earned income tax credit (both of which are refundable credits), dependent care credits, child credits, Individual Retirement Account (IRA) contributions, and education expenses such as the Hope Scholarship and the Lifetime Learning Credit. Other implications may also be allowed by law, regulation, rulings, or other origin.

As a general rule, tax is due on "all income from whatever source derived, unless excluded by law" 1.61-1(a) of the U.S. Tax Code. Therefore, the taxpayer may reduce their tax burden by claiming various exclusions from all income that are allowed by law. Examples of these exclusions from income include compensation for certain services, certain gross income from business, certain gains from dealings in property, certain interest, certain rents, certain royalties, certain dividends, certain alimony and other spousal maintenance, certain annuities, income from life insurance, pensions, income from discharge of indebtedness, partnership income, income from a decedent, and interest in an estate or trust.

Deductions reduce the amount of taxable income based upon a certain type of expense or expenditure. Deductions may be based upon expenses incurred to produce additional income, for a charitable purpose, losses, and the like. Tax deductions can be classified into those above the line, which are beneficial to the taxpayer regardless of income, and below the line, which are only valuable to the extent that they exceed the standard deduction amount of the taxpayer. Examples of deductions are presented above.

In embodiments of the invention, a self-preparation tax return product utilizes the invention. For example, if the taxpayer uses a self-preparation tax return product, such as tax preparation software, embodiments of the invention provide a service to the taxpayer in conjunction with using the tax preparation software. The service may be provided to the user as a value-added benefit to the tax preparation software or as a pay service.

In embodiments of the invention, the invention is utilized by a tax professional. In these embodiments that are used by the tax professional, the tax professional may use the service in conjunction with preparation and filing of the tax return. The tax professional includes any entity, either a legal person or natural person, or a computer program adapted to preparing taxes or providing other financial services. Examples of tax professionals include, but are not limited to, the following: a company, such as H&R Block, Inc.®, or an employee or agent of such a company; software adapted to prepare tax returns or other financial documents; and a person, legal or natural, who advises or assists the taxpayer in preparing their own tax return.

In other embodiments of the invention, the invention is utilized by a charitable organization, a for-profit company, a non-profit company, or other organization. In these embodiments, the organization may use or provide the services in conjunction with a donation to be made, an economic transaction to the be performed, or for another purpose. Embodiments utilized by the organization may be a free or pay service provided by the organization to clients to help the client in easily maximizing their deductions, incentivizing the usage of the particular organization, to keep records for the organization, to allow the organization to make informed business decisions, or for other business or charitable purposes.

In still other embodiments of the invention, the invention is utilized by a taxing authority. The taxing authority (also known as a revenue service or revenue agency) is a government entity or an entity associated with a government body. The taxing authority has, through prescribed legal authority, the power to assess, levy, and collect taxes. The taxing authority may also have the power to collect other non-tax-related revenue, such as penalties and interest. The taxing authority may perform secondary functions, such as investigating and charging tax fraud, performing audits, etc. The taxing authority can be at any level of government: international, federal, state, county, and city. Examples of taxing authorities include the IRS, the Missouri Department of Revenue, etc. The taxing authority may be motivated to utilize the invention to provide a benefit that could only be available in electronic form, thereby encouraging electronic filing which is easier and cheaper to receive than paper tax returns.

Turning to FIGS. 2-5, the identification of the items in the image will be discussed in more depth. It should be appreciated that while the discussion of FIGS. 2-5 will continue to focus on the exemplary field of use of non-cash charitable donations, embodiments of the invention may be utilized with other fields of use beyond those discussed. In some embodiments, the steps shown in FIG. 2 and discussed below are a more detailed discussion of the image analysis in Step 102 of FIG. 1, including Step 114 the determination of items in the image, Step 116 the request for user confirmation and details, and Step 118 the generation of the list of items by description.

Figure 3:
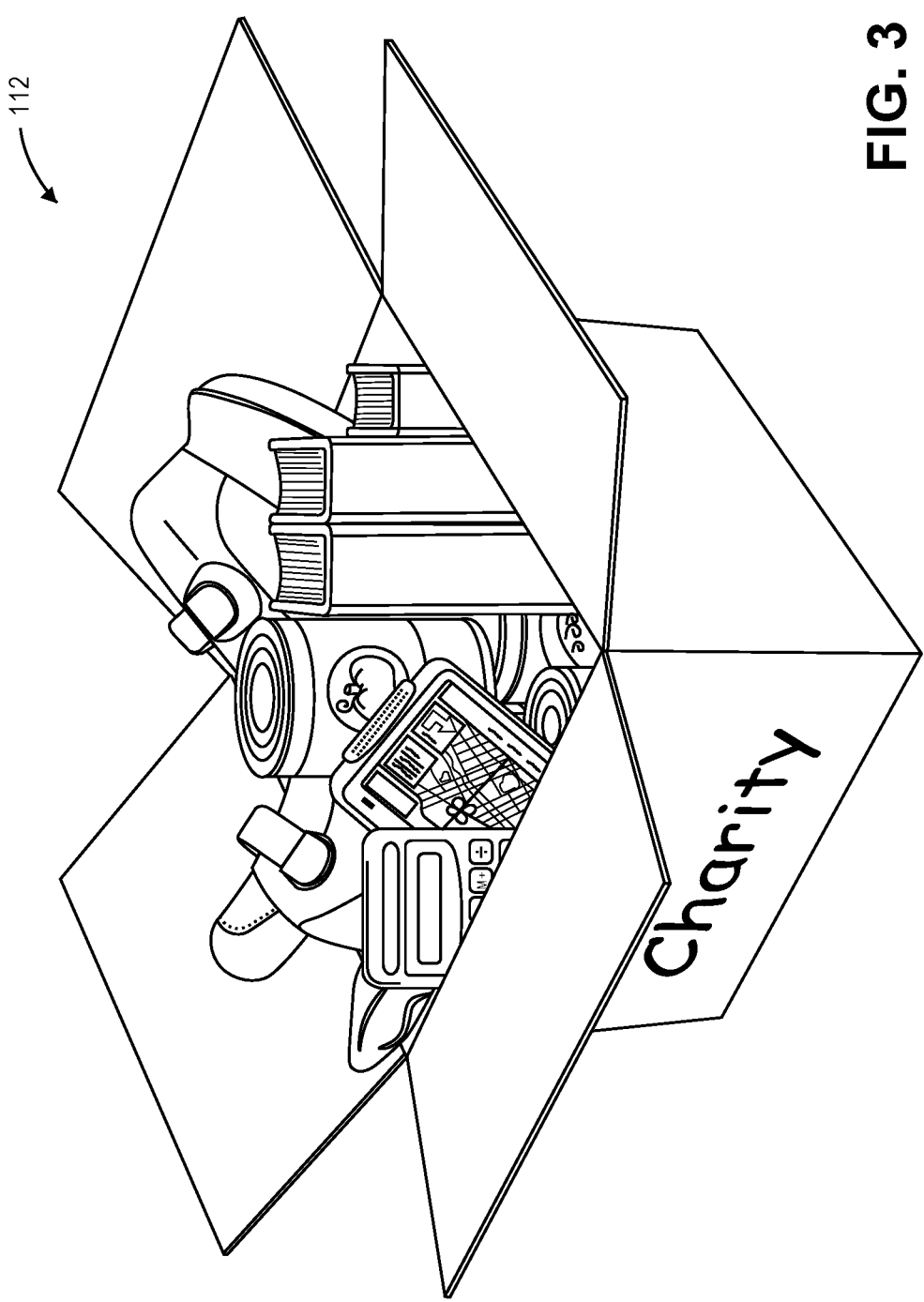
FIG. 3 is an exemplary image to be analyzed.
Figure 4:
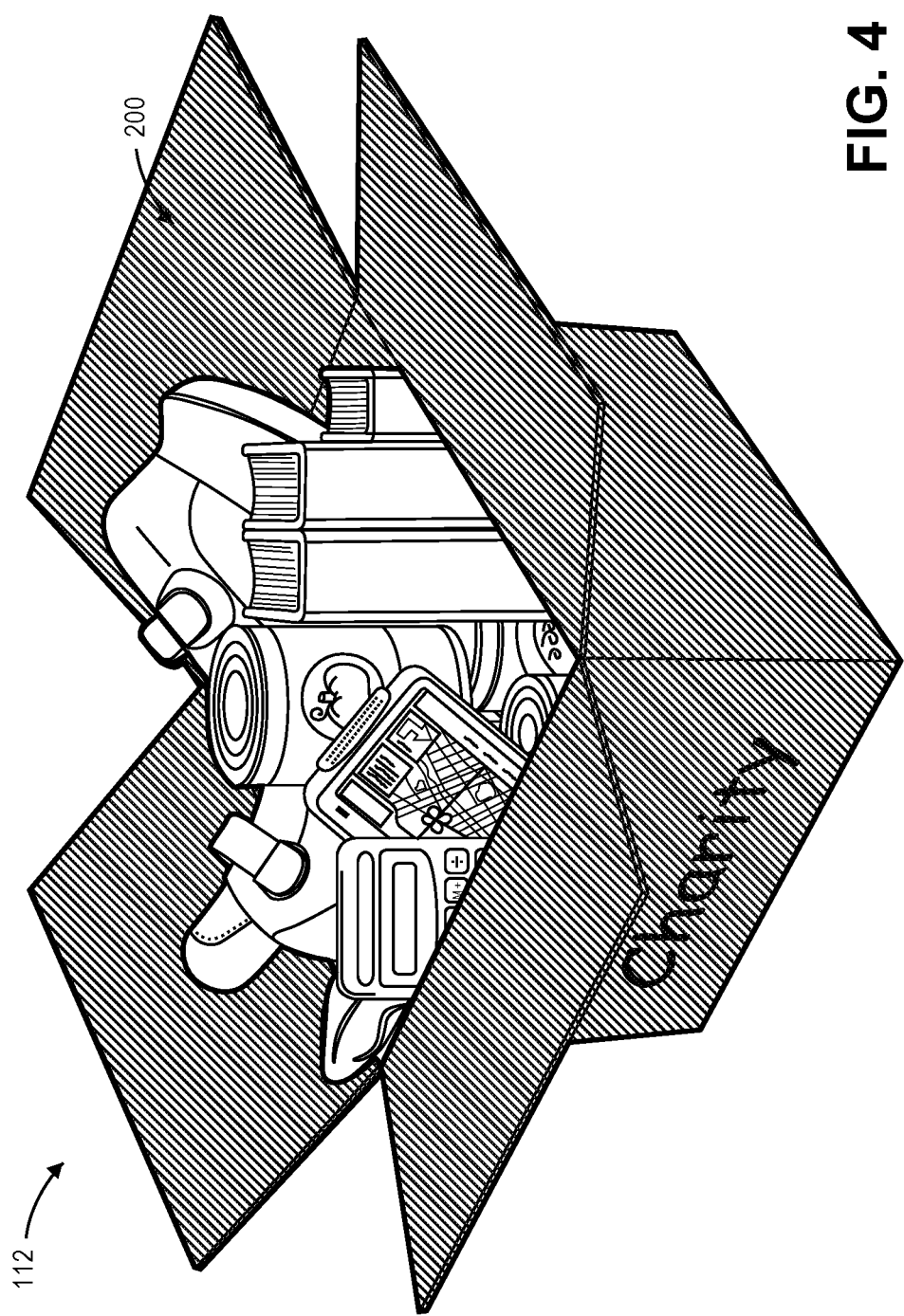
FIG. 4 is the exemplary image of FIG. 3 with the relevant areas identified.
Figure 5:
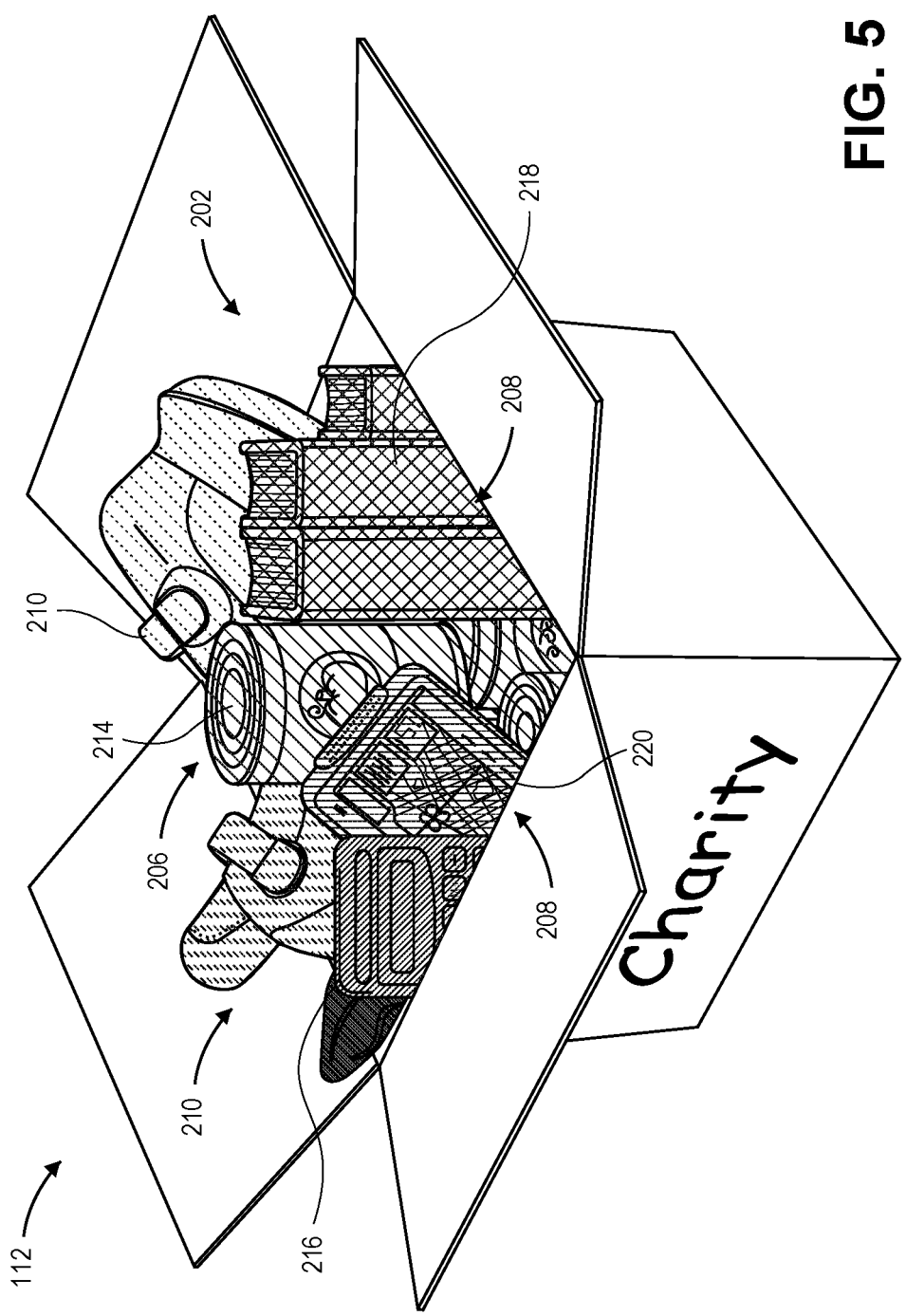
FIG. 5 is the exemplary image of FIG. 3 with individual items identified.

FIG. 3 presents an exemplary image 112. The below-discussed steps will be performed on the exemplary image, as shown in FIGS. 4 and 5 and discussed below. It should be appreciated that the image may be displayed to the user in any or all of the manners shown, or may not be shown to the user at all. The image may be displayed on the GUI or otherwise reproduced for the user. The image may be a direct reproduction of the photograph or video, or may have a filter placed thereon.

In the exemplary image shown in FIG. 3, an exemplary non-cash charitable donation is shown. The non-cash charitable donation is shown in a box labeled "Charity," such that it may be or may have been transported to a charity. Numerous different items are protruding from or located within the box. The user, being the donor, takes photograph or video of the box using, for example, the camera on their smart phone (upon which at least a portion of an embodiment of the invention may be running as an app). In other instances, the photograph is taken by an agent of the charitable organization, being the user, as a component of a receipt provided to the donor. Certain embodiments of the invention may request additional information and/or additional photographs from the user if certain items cannot be fully identified (as discussed below).

In Step 200, the system excludes irrelevant areas in the image and/or identifies relevant areas in the image. The exclusion of irrelevant areas narrows the identification area. Irrelevant areas can include backgrounds, items that are not intended for the intended purpose, and items that are essentially valueless. This determination can include a preliminary or standard identification and valuation. As such, this step may be performed concurrently with other steps. FIG. 4 presents an exemplary image that has had the irrelevant areas excluded and/or the relevant areas included. As shown, the image 112 has a portion thereof excluded by the illustrated hash lines 200. This is illustrative that the excluded area will not be identified or valuated. For example, the shown box, while it may be donated to the charitable organization along with the items therein, is essentially worthless. The user likely cannot deduct the value of the cardboard box from the user's taxes.

In some embodiments, the user may be presented with an option to select or confirm the irrelevant areas and/or the relevant areas. This may be done based upon a preliminary or standard analysis of the image. In other embodiments, the user may be invited to indicate the relevant or irrelevant areas by drawing, outlining, circling, or providing some other indication of the relevant or irrelevant area. In still other embodiments, the user may not be presented with or receive any indication of the irrelevant and/or relevant areas. Instead the analysis is performed and items are identified without any external indication of the irrelevant and/or relevant areas. In yet still other embodiments, there are no irrelevant and/or relevant areas generated or considered. Instead, individual items are identified independently of any irrelevant and/or relevant area (essentially all of the image is considered a relevant area).

In Step 202, the system differentiates between adjacent and/or overlapping items. It should be appreciated that for the convenience of the user, embodiments of the invention do not require individualized images for each item but instead identify more than one item within the image. In Step 204, the system identifies individual items. In some embodiments, Step 202 and Step 204 and performed simultaneously. In other embodiments, Step 202 is not performed at all. Step 202 and/or Step 204 (as well as other later steps) may utilize, employ, or otherwise be associated with various object recognition programs or algorithms.

FIG. 5 presents an exemplary graphical depiction of the items being identified. These individual items depicted will be discussed in more depth below. The individual items may be shown with an overlay shown on a segment of the image that corresponds with the identified item, as shown in FIG. 5. In some embodiments, the identified items overlay (in FIG. 5) and the irrelevant areas overlay (in FIG. 4) may be shown simultaneously on the GUI. In some embodiments, items not overlaid with an identified items overlay are by default the irrelevant areas.

In Step 206, items are identified by a general category. The general category is an overall classification to which the item belongs. In Step 208, items are identified by a specific category. It should be appreciated that in some embodiments, Step 208 follows sequentially from Step 206, such that the specific category is determined based upon the general category. In other embodiments, the level of specificity may be determined by the quality and clarity of the image. As such, some items may be identified by a specific category if sufficient information In Step 210, uncategorized items are identified. Uncategorized items are items for which no category could be identified. The failure to identify may be based upon poor image quality, partial obscureness of the item behind other items, the item not fitting within a known category, or other reasons. As discussed below, the system may request information about the item, ask directly for the category, ask for a clarifying picture of the item, or otherwise request additional information so as to identify and valuate the uncategorized item.

FIG. 5 illustrates an exemplary graphical display shown to the user. The graphical display shows a plurality of item overlays shown on the corresponding areas of identified items. In the example shown, some items (namely canned goods and other food items) are shown by reference number 206 as a general category, some items (namely a personal navigation device, a calculator, and books) are shown by reference number 208 as a specific category, and some items are shown by reference number 210 as uncategorized.

In some embodiments, additional information may be displayed to the user on this screen. Such additional information may include a general category for the item, a specific category for the item, an indication that the item is uncategorized, at least one valuation for the item, a request for additional information about the item, a request for confirmation on the category and/or valuation, additional information, or a combination thereof. Such additional information may be displayed on the GUI by default, displayed upon a mouse-over or hover-over of the item, displayed upon clicking or pressing the item. The display may be adjacent to the item, such as in a call-out box, or in summary form on another part of the screen.

In Steps 212 through 222, a preliminary analysis of the identified item is performed to see if more information is needed from the user. In these embodiments, the system triages which of the identified items need additional information, which may benefit from additional information, and which do not need additional information (either because all needed information is already received or the likely value of the item makes the entering of additional information will provide a low payoff to the user). The system may therefore prioritize, emphasize, or otherwise order or differentiate the items such that so as to encourage the user to provide additional information for at least one item. In some embodiments, the user is invited to provide additional information about all identified and uncategorized items.

In Step 212, general categories are analyzed to determine whether they have possible value. In Step 214, general categories that are of low value are deemed sufficient, such that no additional information is needed from the user. In the example shown in FIG. 5, the items marked as a low value general category are the canned goods shown by reference number 206 and 214. The system may identify the canned goods or other food items and determine that the value of the canned goods is negligible or does not vary between canned goods of various types. As such, no additional information about the canned goods is requested from the user. To continue the example, the system may determine that there are likely more canned goods than are directly visible. The system may therefore request a quantity of the canned goods without any additional information, or determine that the quantity of the canned goods is also of negligible value.

In Step 216, specific categories that are of low value are deemed sufficient such that no additional information is need from the user. In Step 218, specific categories that are of possible value are determined such that the user may be presented an option to provide additional information. In Step 220, specific categories that are of high value are determined such that additional information may be specifically requested from the user.

Examples of these types of items are also illustrated in FIG. 5. The calculator, shown by reference number 216, is deemed to be of low potential value and/or of a relatively certain value (as the range of values of calculators is narrow). As such, a generic calculator valuation will be obtained (or will remain) the valuation for the calculator. The books, shown by reference number 218, are deemed to be of possible value and/or an uncertain value (as the range of values of books is wide). As such, additional information may help increase the valuation, absent which a more generic valuation of the books will be used. The personal navigation device, shown by reference number 220, is deemed to be of high potential value and/or an uncertain value (as the range of values of personal navigation devices is also wide). As such, additional information may be specifically requested or required of the user to arrive at a more accurate valuation.

For example, the additional information may include a manufacturer name, a model number, a size, a feature, a year of manufacture, an original purchase price, a length of ownership, or other information. As another example, the additional information could be a photograph of an information plate on or associated with the item, upon which an optical character recognition ("OCR") function is performed. The OCR allows the system to read the information plate so as to determine make, model, serial number, and other information that may aid in correct valuation. As such, an image of a shirt better identified by identifying branding, logos, and other information specific to that shirt and therefore calculate a more accurate value for it. Another example is an image of a desk may be differentiated between a generic inexpensive desk and a designer expensive desk, based upon specific dimensions, shapes, colors, and other characteristics.

In Step 222, uncategorized items may be rectified by requesting additional information from the user and/or requesting an additional image of the item. As discussed above, additional information about the item may be specifically requested or required of the user. Also as discussed above, the additional information may include an additional photograph so as to allow for the identification of the item. Additionally or alternatively, the user may be provided with categories to manually select.

In Step 224, items are described by the general category alone. In Step 226, items are described by a specific category (which may be provided in addition to a general category) alone. In Step 228, items are described by a specific category plus additional information provided by the user. These descriptions may be presented to the user in a receipt, on the image, as an overlay, or in another representation. In other embodiments, the descriptions are not presented to the user but are instead used in the valuation calculations discussed above in reference to FIG. 1. In Step 230, the overall list of items is prepared so as to be valuated. Some items on the list of items may use standard valuations. Other items on the list may use specific valuations that are calculated for that item. Still other items may be given a final valuation based at least in part on the specific valuation that has been adjusted or altered for a particular purpose.

Figure 6:
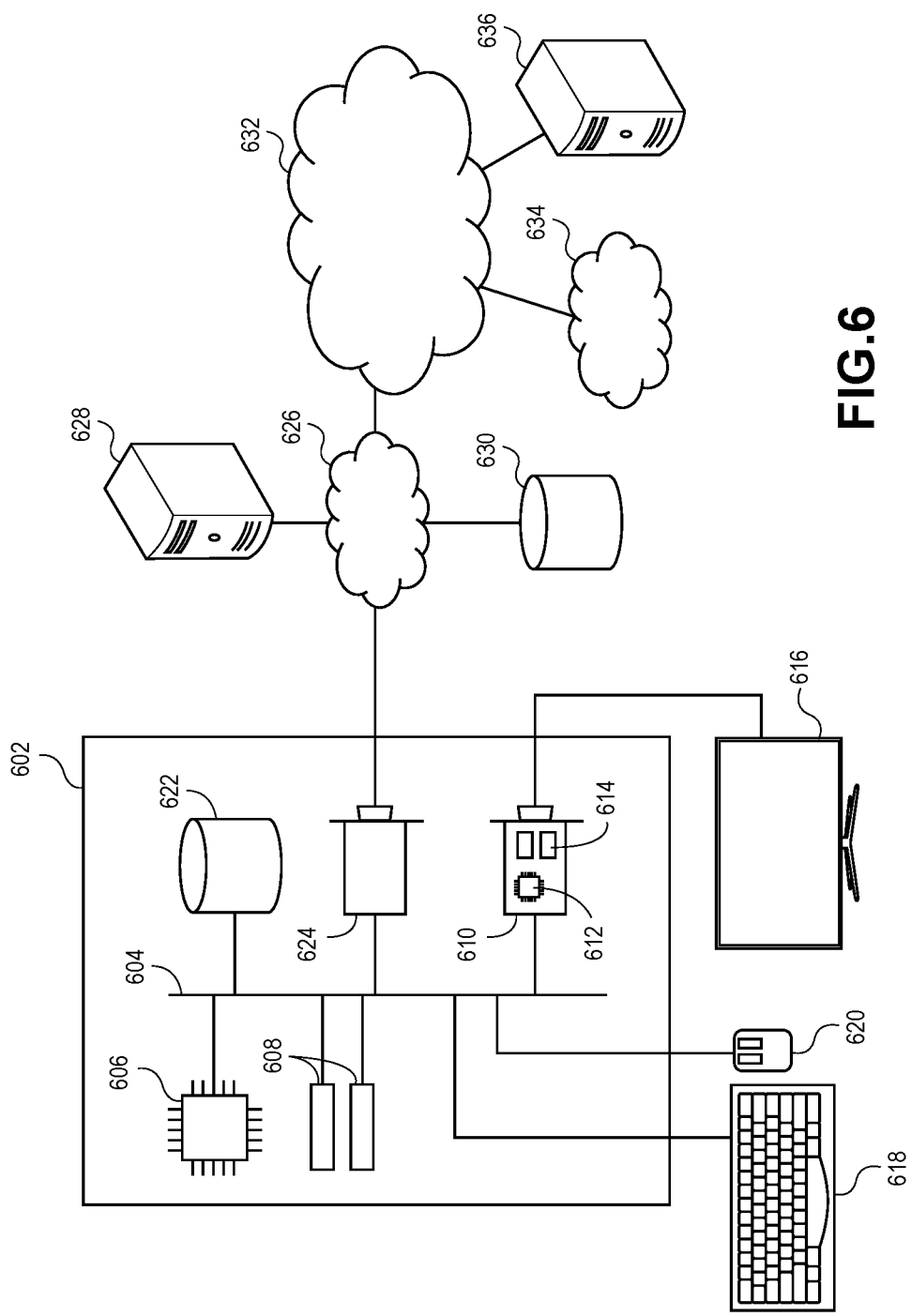
FIG. 6 is a system diagram of an embodiment of the invention depicting various computing devices and their components.

Turning to FIG. 6, the specific components of the system will now be discussed. An exemplary hardware platform for certain embodiments of the invention is depicted. Computer 602 can be a desktop computer, a laptop computer, a server computer, a mobile device such as a smartphone or tablet, or any other form factor of general- or special-purpose computing device. Depicted with computer 602 are several components, for illustrative purposes. In some embodiments, certain components may be arranged differently or absent. Additional components may also be present. Included in computer 602 is system bus 604, whereby other components of computer 602 can communicate with each other. In certain embodiments, there may be multiple busses or components may communicate with each other directly. Connected to system bus 604 is central processing unit (CPU) 606. Also attached to system bus 604 are one or more random-access memory (RAM) modules 608. Also attached to system bus 604 is graphics card 610. In some embodiments, graphics card 610 may not be a physically separate card, but rather may be integrated into the motherboard or the CPU 606. In some embodiments, graphics card 610 has a separate graphics-processing unit (GPU) 612, which can be used for graphics processing or for general purpose computing (GPGPU). Also on graphics card 610 is GPU memory 614. Connected (directly or indirectly) to graphics card 610 is display 616 for user interaction. In some embodiments no display is present, while in others it is integrated into computer 602. Similarly, peripherals such as keyboard 618 and mouse 620 are connected to system bus 604. Like display 616, these peripherals may be integrated into computer 602 or absent. Also connected to system bus 604 is local storage 622, which may be any form of computer-readable media, and may be internally installed in computer 602 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-usable instructions, data structures, program modules, and other data representations.

Finally, network interface card (NIC) 624 is also attached to system bus 604 and allows computer 602 to communicate over a network such as network 626. NIC 624 can be any form of network interface known in the art, such as Ethernet, ATM, fiber, Bluetooth, or Wi-Fi (i.e., the IEEE 802.11 family of standards). NIC 624 connects computer 602 to local network 626, which may also include one or more other computers, such as computer 628, and network storage, such as data store 630. Generally, a data store such as data store 630 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 628, accessible on a local network such as local network 626, or remotely accessible over Internet 632. Local network 626 is in turn connected to Internet 632, which connects many networks such as local network 626, remote network 634 or directly attached computers such as computer 636. In some embodiments, computer 602 can itself be directly connected to Internet 632.

The system may comprise computing devices to facilitate the functions and features described herein. The computing devices may comprise any number and combination of processors, controllers, integrated circuits, programmable logic devices, or other data and signal processing devices for carrying out the functions described herein, and may additionally comprise one or more memory storage devices, transmitters, receivers, and/or communication busses for communicating with the various devices of the system.

The computer program of embodiments of the invention comprises a plurality of code segments executable by the computing device for performing the steps of various methods of the invention. The steps of the method may be performed in the order discussed, or they may be performed in a different order, unless otherwise expressly stated. Furthermore, some steps may be performed concurrently as opposed to sequentially. Also, some steps may be optional. The computer program may also execute additional steps not described herein. The computer program, system, and method of embodiments of the invention may be implemented in hardware, software, firmware, or combinations thereof using the system, which broadly comprises server devices, computing devices, and a communication network.

The computer program of embodiments of the invention may be responsive to user input. As defined herein user input may be received from a variety of computing devices including but not limited to the following: desktops, laptops, calculators, telephones, smartphones, or tablets. The computing devices may receive user input from a variety of sources including but not limited to the following: keyboards, keypads, mice, trackpads, trackballs, pen-input devices, printers, scanners, facsimile, touchscreens, network transmissions, verbal/vocal commands, gestures, button presses or the like.

The server devices and computing devices may include any device, component, or equipment with at least one processing element and at least one memory element. The processing element may implement operating systems, and may be capable of executing the computer program, which is also generally known as instructions, commands, software code, executables, applications ("apps"), and the like. The at least one processing element may comprise processors, microprocessors, microcontrollers, field programmable gate arrays, and the like, or combinations thereof. The at least one memory element may be capable of storing or retaining the computer program and may also store data, typically binary data, including text, databases, graphics, audio, video, combinations thereof, and the like. The at least one memory element may also be known as a "computer-readable storage medium" and may include random access memory (RAM), read only memory (ROM), flash drive memory, floppy disks, hard disk drives, optical storage media such as compact discs (CDs or CDROMs), digital video disc (DVD), and the like, or combinations thereof. In addition to the at least one memory element, the server devices may further include file stores comprising a plurality of hard disk drives, network attached storage, or a separate storage network.

The computing devices may specifically include mobile communication devices (including wireless devices), work stations, desktop computers, laptop computers, palmtop computers, tablet computers, portable digital assistants (PDA), smart phones, and the like, or combinations thereof. Various embodiments of the computing device may also include voice communication devices, such as cell phones and/or smart phones. In preferred embodiments, the computing device will have an electronic display operable to display visual graphics, images, text, etc. In certain embodiments, the computer program facilitates interaction and communication through a graphical user interface (GUI) that is displayed via the electronic display. The GUI enables the user to interact with the electronic display by touching or pointing at display areas to provide information to the system.

The communication network may be wired or wireless and may include servers, routers, switches, wireless receivers and transmitters, and the like, as well as electrically conductive cables or optical cables. The communication network may also include local, metro, or wide area networks, as well as the Internet, or other cloud networks. Furthermore, the communication network may include cellular or mobile phone networks, as well as landline phone networks, public switched telephone networks, fiber optic networks, or the like.

The computer program may run on computing devices or, alternatively, may run on one or more server devices. In certain embodiments of the invention, the computer program may be embodied in a stand-alone computer program (i.e., an "app") downloaded on a user's computing device or in a web-accessible program that is accessible by the user's computing device via the communication network. As used herein, the stand-alone computer program or web-accessible program provides users with access to an electronic resource from which the users can interact with various embodiments of the invention.

In embodiments of the invention, users may be provided with different types of accounts. Each type of user account may provide their respective users with unique roles, capabilities, and permissions with respect to implementing embodiments of the invention. For instance, the taxpayer may be provided with a taxpayer account that permits the taxpayer to access embodiments of the invention that are applicable to preparing a tax return. Additionally, the tax preparer may be provided with a tax preparer account. Additionally, the charitable organization or other organization may be provided with an organizational account that permits the organization to provide receipts and other accountings of items with which the organization has interacted. In addition, any number and/or any specific types of account are provided to carry out the functions, features, and/or implementations of the invention. Upon the taxpayer and/or tax preparer logging in to the electronic resource for a first time, they may be required to provide various pieces of identification information to create their respective accounts. Such identification information may include, for instance, personal name, business name, email address, phone number, or the like. Upon providing the identification information, the taxpayer, external entity, and/or tax preparer may be required to enter (or may be given) a username and password, which will be required to access the electronic resource.

Although embodiments of the invention have been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A non-transitory computer readable storage medium having a computer program stored thereon for identifying and valuating an item, wherein execution of the computer program by at least one processing element performs the following steps:
    acquiring an image from live data;
    identifying a trend associated with the image using a machine learning technique;
    determining an irrelevant area of the image and a relevant area of the image;
    excluding the irrelevant area of the image;
    analyzing the relevant area of the image to differentiate between the item and one or more adjacent items;
    analyzing the relevant area of the image to determine a valuation category associated with the item;
    identifying the item based at least in part on the valuation category and the trend;
    based on the valuation category, displaying, to a user via a graphical user interface, a request for additional information for the item;
    accessing a valuation database to acquire a set of valuation information; and
    determining a valuation for the item, based at least in part on the valuation category, the additional information, and the valuation information from the valuation database.

2. The non-transitory computer readable storage medium of claim 1,
    wherein the valuation database is a market database associated with an online marketplace,
    wherein the set of valuation information reflects a current selling price for the item.

3. The non-transitory computer readable storage medium of claim 1, wherein the request for additional information is based at least in part on the valuation category having a wide range of potential values so as to increase accuracy of the valuation.

4. The non-transitory computer readable storage medium of claim 1, further comprising the following steps:
    accessing a second valuation database to acquire a supplemental set of valuation information; and
    comparing the set of valuation information to the supplemental set of valuation information.

5. The non-transitory computer readable storage medium of claim 4, wherein said step of determining the valuation is further based at least in part on the supplemental set of valuation information.

6. The non-transitory computer readable storage medium of claim 1,
    wherein the item is a first item,
    wherein the valuation category is a first valuation category,
    further comprising the following step:
        analyzing the image to determine a second valuation category associated with a second item.

7. The non-transitory computer readable storage medium of claim 6, further comprising the following steps:
    calculating a second valuation for the second item.

8. The non-transitory computer readable storage medium of claim 1, further comprising the following step:
    displaying, to the user via the graphical user interface, a representation of the image on the graphical user interface; and
    displaying, to the user via the graphical user interface, an item overlay on a segment of the representation of the image.

9. The non-transitory computer readable storage medium of claim 8, further comprising the following step:
    displaying, to the user via the graphical user interface, the valuation category of the item and the valuation of the item on the graphical user interface.

10. The non-transitory computer readable storage medium of claim 1, further comprising the following step:
    utilizing the valuation to adjust an insurance claim.

11. The non-transitory computer readable storage medium of claim 1, further comprising the following step:
    utilizing the valuation to claim a deduction on a tax return.

12. A non-transitory computer readable storage medium having a computer program stored thereon for identifying and valuating items based upon an image, wherein execution of the computer program by at least one processing element performs the following steps:
    receiving the image from live video data;
    determining an irrelevant area of the image and a relevant area of the image;
    excluding the irrelevant area of the image;
    analyzing the relevant area of the image to determine a first item and a second item;
    determining a first valuation category that corresponds to the first item and a second valuation category that corresponds to the second item;
    identifying the first item based at least in part on the first valuation category;
    identifying the second item based at least in part on the second valuation category;
    displaying, to a user via a graphical user interface, the live video data including the relevant area of the image with an augmented reality overlay based on the valuation category associated with the item;

displaying, to the user via the graphical user interface, a request for additional information for the first item based on the first valuation category;
accessing a valuation database to acquire a set of valuation information;
determining a first valuation for the first item, based at least in part on the first valuation category, the additional information, and the valuation information from the valuation database; and
determining a second valuation for the second item, based at least in part on the second valuation category and the valuation information from the valuation database.

13. The non-transitory computer readable storage medium of claim 12,
wherein the valuation database is a market database associated with an online marketplace,
wherein the set of valuation information reflects a current selling price for the item.

14. The non-transitory computer readable storage medium of claim 12, wherein the request for additional information is based at least in part on the first valuation category having a wide range of potential values so as to increase accuracy of the valuation.

15. The non-transitory computer readable storage medium of claim 12, further comprising the following steps:
accessing a second valuation database to acquire a supplemental set of valuation information; and
comparing the set of valuation information to the supplemental set of valuation information,
wherein said step of determining the valuation is further based at least in part on the supplemental set of valuation information.

16. The non-transitory computer readable storage medium of claim 12, wherein the augmented reality overlay comprises an item overlay.

17. The non-transitory computer readable storage medium of claim 12, further comprising the following step:
utilizing the valuation to claim a deduction on a tax return.

18. A system for identifying and valuating items based upon an image, the system comprising:
a camera for capturing live video data including an image of an item;
a valuation database having associated valuation information; and
a processor configured to:
identify a trend associated with the image using a machine learning technique;
determine an irrelevant area of the image and a relevant area of the image;
exclude the irrelevant area of the image;
analyze the relevant area of the image to determine a valuation category associated with the item;
identify the item based at least in part on the valuation category and the trend;
present, to a user via a graphical user interface, the live video data including the relevant area of the image with an augmented reality overlay based on the valuation category associated with the item;
present, to the user via the graphical user interface, a request for additional information for the item based on the valuation category associated with the item;
access the valuation database to acquire a set of valuation information; and
determine a valuation for the item, based at least in part on the valuation category, the additional information, and the valuation information from the valuation database.

19. The system of claim 18,
wherein the valuation database is a market database associated with an online marketplace,
wherein the set of valuation information reflects a current selling price for the item.

20. The system of claim 18, further comprising
displaying, to the user via the graphical user interface, information indicative of the valuation category of the item and the valuation of the item on the graphical user interface.

* * * * *